United States Patent Office 2,768,211
Patented Oct. 23, 1956

2,768,211
PROCESS FOR PREPARING DIARYLSULFONES

Edmund B. Towne and Hubert M. Hill, Kingsport, Tenn., assignors to Eastman Kodak Company, Rochester, N. Y., a corporation of New Jersey No Drawing. Application July 14, 1953,
Serial No. 367,998

18 Claims. (Cl. 260—607)

This invention relates to a process for preparing diarylsulfones by condensing an arylsulfonyl chloride with an aromatic compound in the presence of an arylsulfonic acid as the condensing agent.

It is well known that an arylsulfonyl chloride can be reacted with an aromatic hydrocarbon in the presence of a molecularly equivalent quantity of aluminum chloride at relatively low temperatures to form diarylsulfones; however, aluminum chloride constitutes an undesirably expensive reagent. It is also known that an aromatic hydrocarbon such as toluene will react at relatively high temperatures (180–200° C.) with toluenesulfonic acid to form ditolysulfone. However, when toluenesulfonic acid and toluene are refluxed together at about 110° C. for 72 hours, the yield of ditolylsulfone obtained is not much more than about 10%.

We have now found that excellent yields of diarylsulfones can be obtained by reacting a mixture of p-toluenesulfonyl chloride and p-toluenesulfonic acid with an excess of toluene without employing aluminum chloride and without the necessity of employing temperatures approaching 200° C. According to our invention, excellent yields on the order of about ninety percent can be obtained employing temperatures as low as about 110° C. It would appear that the toluenesulfonic acid employed in accordance with the process of our invention acts as a condensing agent and also enters to some extent into the condensation of toluenesulfonyl chloride and toluene. It is of no consequence whether the toluenesulfonic acid enters into the condensation since whatever amount remains after the condensation is completed can be readily employed in the condensation of another quantity of toluenesulfonyl chloride with toluene. More toluenesulfonic acid can be added to replace that consumed. We have also found that the process of this invention is applicable to the condensation of other aromatic compounds employing other aromatic sulfonic acids.

It is an object of this invention to provide a new process for the preparation of diarylsulfones. It is a further object of this invention to provide such a process which gives excellent yields at temperatures of about 100° C. and somewhat higher temperatures without the employment of aluminum chloride or other similar condensing agents. Other objects appear elsewhere in this specification.

According to this invention a process is provided for preparing a diarylsulfone having the following formula:

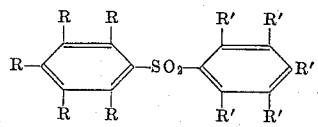

wherein each of R and R' represents a substituent selected from the group consisting of an H atom, a halogen atom and an alkyl radical containing from 1 to 6 carbon atoms which comprises condensing at a temperature of about 100° C. to about 200° C. one molecular proportion of a sulfonyl chloride having the formula:

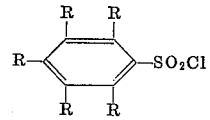

wherein each R is defined above, with a molecular excess of an aromatic compound having the formula:

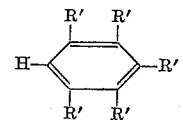

wherein each R' is defined above, in the presence of from about 1 to about 0.1 molecular proportion of a sulfonic acid having the formula:

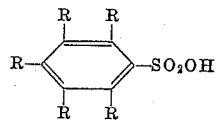

wherein each R is defined above.

It is convenient in conducting the process of this invention to employ reflux conditions (about 110° C.). However, the reaction can be more advantageously carried out at higher temperatures up to about 200° C. At 180°–200° C., the reaction is completed in from 1–3 hours. This can be compared to a reaction period of 8–20 hours which is required when toluene sulfonic acid and toluene are reacted in the absence of any sulfonyl chloride.

It is advantageous to maintain the reaction conditions until a quantity of hydrogen chloride is formed which is substantially molecularly equivalent to the amount of sulfonyl chloride being condensed.

The amount of sulfonyl chloride in proportion to the amount of sulfonic acid can be varied over a wide range. It is particularly advantageous to employ a higher ratio of sulfonyl chloride to sulfonic acid, as the reaction ceases (especially at lower temperatures) when the sulfonyl chloride is used up. The table below gives exemplary ratios of toluene-sulfonyl chloride to toluene sulfonic acid and the temperature, time and yields obtained:

| Moles CH₃-⟨⟩-SO₂Cl | Moles CH₃-⟨⟩-SO₃H | Temperature, degrees | Time, hours | Yield, percent |
|---|---|---|---|---|
| 1 | 1 | 110 | 72 | 89 |
| 1 | 1 | 170 | ½ | 95 |
| 1.5 | 0.5 | 175 | 2 | 90 |
| 0.90 | 0.1 | 200 | 3 | 76.5 |

It is believed that p-toluene sulfonic acid and toluene form a mixture of isomeric sulfones at a given temperature at a definite rate; whereas, under the same lower temperature conditions p-toluene sulfonyl chloride and toluene do not react. Moreover, under the higher temperature conditions, a mixture of p-toluene sulfonic acid, p-toluene sulfonyl chloride and toluene will react to give a higher yield of isomeric sulfones at a rate 8 to 10 times as fast as when the sulfonyl chloride is not present.

The reaction can advantageously be conducted in a continuous manner whereby a sulfonyl chloride and an aromatic compound are continuously introduced into the reaction zone with the concentration of sulfonic acid being maintained at about one third molecular proportion or less on a molecularly equivalent basis in relation to the concentration of the sulfonyl chloride; in such a continuous process a portion of the reaction mixture can be continuously removed from the reaction zone and returned thereto after some of the diarylsulfone is removed therefrom. Other continuous processes can also be employed.

Examples of sulfonyl chlorides which can be employed in accordance with this invention include p-toluenesulfonyl chloride, benzenesulfonyl chloride, p-chlorobenzenesulfonyl chloride, o,p-dichlorobenzenesulfonyl chloride, o-chloro-p-toluenesulfonyl chloride, p-n-butylsulfonyl chloride, o-methyl-p-n-hexylbenzenesulfonyl chloride, p-isopropylsulfonyl chloride, p-bromobenzenesulfonyl chloride, etc. Mixtures of such sulfonyl chlorides can also be employed.

Examples of aromatic compounds which can be employed in accordance with this invention include benzene, toluene, m-xylene, chlorobenzene, o,p-dichlorobenzene, bromobenzene, n-hexylbenzene, sec. butylbenzene, etc. Mixtures of such compounds can also be employed.

Examples of sulfonic acids which can be employed in accordance with the process of this invention include those sulfonic acids which correspond to the sulfonyl chlorides listed above. Mixtures of such compounds can also be employed. It is advantageous to employ sulfonic acids corresponding to the sulfonyl chlorides inasmuch as the sulfonic acid enters into the condensation reaction to some extent depending upon the temperature and other reaction conditions; however, it may not be advantageous in some instances to employ the corresponding sulfonic acid when a mixed product is sought.

The diarylsulfones which can be prepared in accordance with this invention may be composed of a mixture of various isomers depending upon the reactivities of the various hydrogen atoms on the benzene nucleus of the aromatic compound or compounds employed.

Some of the diarylsulfones produced can be employed as heat transfer agents due to their excellent stability at elevated temperatures. Some of the diarylsulfones can be employed as plasticizers for cellulose acetate-butyrate and other cellulose esters, polymers of vinyl chloride, methacrylonitrile, and other polymers of ethylenically unsaturated organic compounds, etc. Diarylsulfones such as ditolylsulfone can be oxidized by known procedure to yield sulfonyl dibenzoic acid and other similar acids. The diarylsulfones can also be used as intermediates in the preparation of other organic compounds.

The following examples will serve to further illustrate our invention. The yields of product are based upon the sulfonyl chloride for the following reason: If the reaction is stopped when the evolution of HCl ceases, it is found that the amount of sulfonic acid recovered is approximately equal to that originally used. This reaction at that stage will not proceed further except under the conditoins that would be employed if the acid chloride were absent.

*Example 1.—Ditolylsulfone*

One mole (190 g.) of p-toluenesulfonic acid monohydrate was refluxed with 425 ml. of toluene employing a water separator until 18 ml. of water was collected. Then 191 g. (1 mole) of p-toluenesulfonyl chloride was added and the mixture refluxed for 72 hours. Hydrogen chloride was evolved. The mixture was next steam distilled to remove excess toluene. The product, which is a mixture of isomeric sulfones, weighs 218 g. (0.887 mole) which is 89% of theory based on the sulfonyl chloride. By crystallization from ethanol, there was obtained 130 g. of p-tolylsulfone, M. P. 159–160° C.

*Example 2.—Ditolylsulfone*

One mole of p-toluenesulfonic acid monohydrate was dehydrated by refluxing with toluene. Then one mole of p-toluene-sulfonyl chloride was added and the mixture was heated to distill off the excess toluene. The mixture was then heated to 170° C. and toluene preheated to 170° C. was passed through the mixture for ½ hour, after which time no more hydrogen chloride was evolved. The mixture was dumped into 2 liters of cold water. It was then steamed to remove any toluene and to dissolve unreacted sulfonic acid. The product was next recovered by filtration and dried. The dry product, which is a mixture of isomeric ditolylsulfones, weighed 233 g. (0.047 mole). This is a yield of about 95% based on the sulfonyl chloride.

*Example 3.—Ditolylsulfone*

One-half mole (95 g.) of p-toluenesulfonic acid monohydrate was dehydrated by refluxing with toluene. To this was added 287 g. (1.5 mole) of p-toluenesulfonyl chloride. This mixture was heated to 175° C. and then toluene preheated to 175° C. was passed through it for 2 hours. After this time, no more hydrogen chloride was evolved. The mixture was poured into water, and treated as in Example 2. There was obtained 332 g. (1.35 mole) (90% yield) of mixed isomers of ditolylsulfones.

*Example 4.—p-Tolylphenylsulfone*

One mole (190 g.) of p-toluenesulfonic acid monohydrate was dehydrated by refluxing with benzene. To this was added 191 g. (1 mole) of p-toluenesulfonyl chloride and preheated benzene was passed through the mixture for 1 hour at 160° C. After working up in the manner of Example 2, there was obtained 204 g. (0.883 mole) of p-tolylphenylsulfone, M. P. 78–79° C.

*Example 5.—p-Tolyl-p-chlorophenylsulfone*

An equal molecular mixture of p-toluenesulfonic acid and p-toluenesulfonyl chloride was reacted with chlorobenzene in the same manner as described in Example 4 except that the temperature was 185° C. There was obtained an 85% yield of a mixture of p-tolyl-p-chlorophenylsulfone and p-tolyl-o-chlorophenylsulfone.

*Example 6.—p-Tolyl-2,4-xylylsulfone*

Meta-xylene was reacted with a mixture of p-toluenesulfonic acid and p-toluenesulfonyl chloride at 160° C. as described in Example 4. There was obtained a 65% yield of p-tolyl-2,4-xylylsulfone, M. P. 119–120° C.

*Example 7.—Diphenylsulfone*

One mole of benzenesulfonic acid hydrate was dehydrated by azeotropic distillation with benzene. Then one mole of benzene sulfonyl chloride was added and preheated benzene was passed through the mixture at 150° C. for 1½ hrs. When worked up in the manner described in Example 2, there was obtained a 92% yield of diphenylsulfone, M. P. 127–128° C.

*Example 8.—Phenyl-p-tolylsulfone*

One mole of benzenesulfonic acid and one mole of benzenesulfonyl chloride were reacted with toluene at 160° C. as described in Example 4 for 1½ hrs. There was obtained a high yield of phenyl-p-tolylsulfone.

*Example 9.—Phenyl-p-chlorophenylsulfone*

A mixture of p-chlorobenzenesulfonic acid and p-chlorobenzene sulfonyl chloride was reacted as described in Example 4 except that the temperature was 170° C. and benzene was passed through it for 2 hours. From this there was obtained an 85% yield of phenyl-p-chlorophenylsulfone, M. P. 89–90° C.

*Example 10.—p-Chlorophenylsulfone*

In a similar manner to that described in Example 4, a mixture of p-chlorobenzene sulfonic acid and p-chlorobenzene sulfonyl chloride was reacted with chlorobenzene at 180° C. for 3 hours. There was obtained a good yield of a mixture of bis (p-chlorophenyl) sulfone and p-chlorophenyl-o-chlorophenylsulfone.

The above examples clearly indicate how other diarylsulfones can be similarly prepared employing other arylsulfonylchlorides, other aromatic compounds and other arylsulfonic acids at temperatures of from about 100° C. to about 200° C.

The following example shows that the ratio of p-toluenesulfonyl chloride to p-toluenesulfonic acid can be as high as 9:1 or higher and give excellent yields:

*Example 11.*—(*Using 0.05 mole p-toluene sulfonic acid monohydrate and 0.95 mole p-toluene sulfonyl chloride*)

9.5 g. (0.05 mole) of p-toluenesulfonic acid monohydrate and 181 g. (0.95 mole) of p-toluenesulfonyl chloride were placed in a reactor and heated to 120° C. Toluene vapor was then passed through the mixture at 200° C. for 3 hours. HCl was evolved. The product was steam distilled and the solid was washed free of toluenesulfonic acid and dried. The product which was a mixture of isometric tolylsulfones weighed 178.7 g. There also was recovered 0.191 mole of toluene sulfonic acid monohydrate; this is a conversion of 80.6% based on the p-toluene sulfonyl chloride.

In partial summary the following points can be emphasized once again:

a. Excess toluene vapor at 180–200° C. reacts with p-toluenesulfonic acid to give up to a 65% yield of isomeric ditolyl sulfones in 8–20 hours. This reaction at the reflux temperature of toluene gives only 10–20% isomeric ditolyl sulfones in 72 hours.

b. Toluenesulfonyl chloride plus toluene vapor under these conditions do not react.

c. Toluenesulfonyl chloride will react with excess toluene in the presence of 1 to 0.1 molar equivalent of p-toluene sulfonic acid to yield about 90% of isomeric ditolylsulfones at 110 to 200° C.

d. At the reflux temperature of toluene (110°) the reaction under c takes 72 hours whereas at 170° the reaction is complete in ½ hour; see table above.

We claim:

1. A process for preparing a diarylsulfone having the following formula:

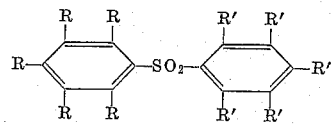

wherein each of R and R' represents a substituent selected from the group consisting of an H atom, a chlorine atom, a bromine atom, and an alkyl radical containing from 1 to 6 carbon atoms, which comprises condensing at a temperature of from about 100° C. to about 200° C. one molecular proportion of a sulfonyl chloride having the formula:

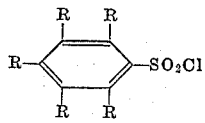

wherein each R is defined above, with a molecular excess of an aromatic compound having the formula:

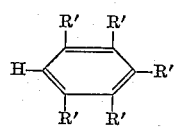

wherein each R' is defined above, in the presence of at least about 0.1 molecular proportions of a sulfonic acid having the formula:

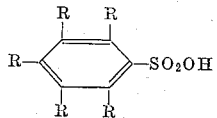

wherein each R is defined above.

2. A process as defined in claim 1 wherein from about 1 to 0.1 molecular proportion of the defined sulfonic acid is employed.

3. A process as defined in claim 1 wherein the elevated temperature is maintained until a quantity of hydrogen chloride is formed which is substantially molecularly equivalent to the quantity of sulfonyl chloride being condensed.

4. A process as defined in claim 1 wherein p-toluenesulfonyl chloride and toluene are condensed in the presence of p-toluenesulfonic acid.

5. A process as defined in claim 4 wherein from about 1 to about 0.1 molecular proportions of p-toluenesulfonic acid is employed.

6. A process as defined in claim 5 wherein about one-third of a molecular proportion of p-toluenesulfonic acid is employed.

7. A process as defined in claim 1 wherein p-toluenesulfonyl chloride and benzene are condensed in the presence of p-toluenesulfonic acid.

8. A process as defined in claim 7 wherein from about 1 to about 0.1 molecular proportion of p-toluenesulfonic acid is employed.

9. A process as defined in claim 8 wherein approximately one-third of a molecular proportion of p-toluenesulfonic acid is employed.

10. A process as defined in claim 1 wherein p-toluenesulfonyl chloride and chlorobenzene are condensed in the presence of p-toluenesulfonic acid.

11. A process as defined in claim 10 wherein from about 1 to about 0.1 molecular proportion of p-toluenesulfonic acid is employed.

12. A process as defined in claim 11 wherein approximately one-third of a molecular proportion of the sulfonic acid is employed.

13. A process as defined in claim 1 wherein benzenesulfonyl chloride and benzene are condensed in the presence of benzenesulfonic acid.

14. A process as defined in claim 13 wherein from about 1 to about 0.1 molecular proportion of benzenesulfonic acid is employed.

15. A process as defined in claim 14 wherein approximately one-third of a molecular proportion of benzenesulfonic acid is employed.

16. A process as defined in claim 1 wherein benzenesulfonyl chloride and toluene are condensed in the presence of benzenesulfonic acid.

17. A process as defined in claim 16 wherein from about 1 to about 0.1 molecular proportion of benzenesulfonic acid is employed.

18. A process as defined in claim 17 wherein approximately one-third of a molecular proportion of benzenesulfonic acid is employed.

References Cited in the file of this patent
UNITED STATES PATENTS

| | | |
|---|---|---|
| 2,224,964 | Huismann | Dec. 17, 1940 |
| 2,462,792 | Wadsworth et al. | Feb. 22, 1949 |
| 2,593,001 | Bender et al. | Apr. 15, 1952 |